United States Patent Office 2,920,978
Patented Jan. 12, 1960

2,920,978

STABILIZED POLYESTER FIBRES

David I. Randall, New Vernon, N.J., assignor to General Aniline & Film Corporation, New York, N.Y., a corporation of Delaware No Drawing. Application May 26, 1958
Serial No. 737,551

12 Claims. (Cl. 117—33.3)

The present invention relates to stabilized polyester fibres against degradation upon exposure to ultraviolet light and to a process of preparing the same.

It is known that polyethylene terephthalate is to date one of the fibre-forming polyesters of commercial significance. It is produced under brand means of "Dacron" and "Terylene" as a filament yarn or as a staple fibre in accordance with the procedures outlined in U.S. Patents 2,465,150 and 2,465,319, the disclosures of which with regard to such fibres are incorporated herein by reference thereto.

In common with other synthetic textile materials such as polyamides, polyethylene terephthalate, hereinafter referred to for sake of simplicity merely as polyester fibre, undergoes degradation when exposed to sunlight. The degradation is manifested in a loss of strength and in a reduction of molecular chain length measured by solution viscosity. Different specimens of polyester fibres exhibit somewhat different resistance to sunlight but in general it has been found that polyester fibres are much less resistant than the cellulosic fibres, cotton and rayon. As in many other cases of ultraviolet light degradation, the reaction appears to be an oxidative one and oxygen is essential for its occurrence. In fact many dyestuffs affect the rate of degradation, some by increasing it, others by decreasing it. In all cases however, the effects are quite large and it has not been as yet possible to classify the good and bad dyestuffs in a satisfactory manner. When polyester fibres are exposed to direct sunlight, they have been found to lose about 60% of their strength after an exposure of 500–600 hours. This percentage loss is about the same as that occurring with cotton but considerably less than that occurring with silk and acetate-rayon fibres.

Resistance of polyester fibres to photochemical degradation can be obtained when exposed behind window glass which effectively cuts off the portion of the spectrum that is responsible for the degradation. When so protected, the fibres are excellent for curtains and furnishing fabrics and exhibit high resistance to sunlight. For outdoor uses of polyester fibres such protective means are not practical and as a consequence it has been proposed that the various organic compounds which exhibit the power to absorb light rays within the band of 290 to 3700 m$\mu$ may be suitable if applied in a film-forming dope solution. Among such compounds various dihydroxy benzophenones have been suggested as the ultraviolet absorbing agents. Many of such agents have been previously employed in the stabilization of transparent plastics against the degrading action of harmful ultraviolet radiations.

It has been established by the art that when 2,5-dihydroxy benzophenone is employed for the protection of polymeric vinylidene chloride products against darkening and enbrittling effects of ultraviolet light, considerable discoloration of the product ensues. The 4,4'-isomer is completely ineffective when employed in the same products for the same purpose, and the 2,2'- and 2,4-isomers are only slightly effective as ultraviolet absorbers. The latter isomer is ineffective in filter coatings prepared from lacquers containing a cellulose ester, since the filter has a cut-off at about 290 m$\mu$. In other words, the isomer absorbs none of the ultraviolet light beyond 330 m$\mu$ and as a consequence, the filter containing it is practically transparent to all of the ultraviolet light which is normally present in sunlight at sea level.

2,2'-dihydroxybenzophenone is of limited value in certain types of transparent plastics. While it inhibits the physical breakdown of plastics and other materials in which it is incorporated, it is not satisfactory as a protective material against ultraviolet fading. In other words, this compound is not satisfactory as a protective material against ultraviolet light fading when employed in substantially colorless plastics, resins, film-forming materials, colored textiles, and the like. In some cases the colorless plastics and the like coated with said materials containing this compound become colored after several months. In other cases, slightly colored plastics or film-forming material is itself discolored when exposed to ultraviolet light, and in still other cases, the plastic or film-forming medium offers no protection to the colored object of its transmission of ultraviolet light.

All of the above undesirable manifestations are believed to be due to the tendency of the specific dihydroxy benzophenones to undergo intramolecular changes or to participate in some chemical reaction, such as oxidation, which affect their absorptive capacity. In view of these shortcomings, the application of the foregoing dihydroxy benzophenones to textile fibres, particularly polyester fibres, has not been effective. In most cases in order to be useful as ultraviolet absorbing compounds, they would have to be applied from a fluid bath in the same manner as a dyestuff. Since all of the known dihydroxy benzophenones and various isomers thereof are only soluble in organic solvents, such as alcohol, acetone, etc., solution-treatment of the polyester fibre is inadequate, especially after the treated fibre is subjected to dyeing in an aqueous dyebath. The film or surface absorption of the ultraviolet absorbing compound is loosened by the dyebath or dispersed or shifted into clumps, i.e. precipitated unevenly throughout the yarn filament or staple fibre. In other words. The absorption is only on the surface and amenable to disturbance and in most cases removal by subsequent treatment and dyeing of the fibre. In addition, all of the dihydroxy benzophenones and isomers thereof are not substantive to many of the synthetic textile fibres, particularly polyester fibres.

In the same category are the 2,2',4-trihydroxy-4'-alkoxy benzophenones and 2,2'-dihydroxy-4,4'-dialkoxy benzophenones which have been suggested as ultraviolet absorbents for colorless film-forming plastics, resins and the like. Such benzophenones in order to be applied to textile fibres must be used in solution in a suitable organic solvent which solubilizes the ultraviolet absorbing compound and at the same time has no deleterious effect upon the textile fibre. By such means, a surface absorption is only attainable and subject to the shortcomings discussed above. Moreover, such benzophenones are not substantive to polyester fibres.

I have found that any polyester fibre whether in the form of a filament yarn of approximately 2 denier or staple fibre, i.e. multifilament yarn extending from 30 to 140 denier can be stabilized against ultraviolet light degradation by treating the filament yarn or staple fibre with 0.5–3% solution of either a 2,2'-dihydroxy-4,4'-dialkoxy benzophenone or 2,2',4-trihydroxy-4'-monoalkoxy benzophenone in diethylene glycol at a temperature of 340 to 365° F. The polyester fibre (polyethylene terephthalate) is merely immersed into the solution at the specified temperature range and held there for a short period of time ranging from 5 to 15 seconds. During the treament, the solution uniformly permeates each individual filament of the fibre. The fibre is then removed from the solution, squeezed, rinsed in water and finally soaped if desired. The treated polyester fibre is then ready for dyeing if so desired. The new and unexpected feature of this treatment is that the ultraviolet absorbing benzophenone is completely dissolved in the filaments of the fibre. Subsequent rinsing in water and soaping does not remove the substantially absorbed ultraviolet absorbing compound. In view of this property, the polyester fibre can then be dyed with any class of known dyes having affinity for the fibre thereby protecting not only the fibre itself but the dyes against ultraviolet degradation. Protection is obtained even with those dyes that previously affected the rate of degradation.

The 2,2'-dihydroxy-4,4'-dialkoxy benzophenones and the 2,2',4-trihydroxy-4'-alkoxy benzophenones which I have found to be of specific value as stabilizers for polyester fibres are characterized by the following general formula:

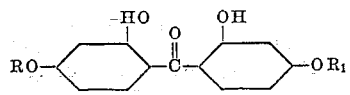

wherein R represents either hydrogen or an alkyl group of 1 to 5 carbon atoms, e.g. methyl, ethyl, propyl, isopropyl, butyl, isobutyl, amyl or isoamyl, and $R_1$ represents an alkyl radical of the same value as in R.

The compounds characterized by the foregoing general formula are illustrated both by name and structure and are prepared in accordance with the disclosure given in U.S. Patents 2,686,812 and 2,693,492, the complete disclosures of which are incorporated herein by reference thereto. Each and every one of the compounds disclosed and claimed in said patents has been found to be operative for the purpose of the present invention.

In practicing the present invention, a solution of either a 2,2'-dihydroxy-4,4'-dialkoxy benzophenone or a 2,2',4-trihydroxy-4'-alkoxy benzophenone in diethylene glycol is first prepared. The solution is then heated to 340–365° F., preferably at about 360° F. and the polyester filament yarn or staple fibre immersed therein for 5 to 15 seconds while maintaining the temperature of the solution preferably at 360° F. After the immersion, the filament yarn or staple fibre is removed, squeezed by any suitable mechanical means, i.e. rollers, rinsed in water and finally soaped if so desired. Following the rinsing in water, the filament yarn or staple fibre may be dried and utilized in the customary fashion. The amount of the said benzophenones in solution is not critical and may range from 0.5 to 3% by weight. Any concentration within this range is sufficient to impart stability to the treated polyester fibre. Amounts above 3% by weight may be employed. The precise, i.e. ultraviolet absorbing amount, may be readily determined by a routine test. When fabricated into clothing or other articles, the staple fibre exhibits excellent resistance to sunlight. In a practical demonstration, a treated fibre of this type was exposed to mercury arc radiation (filtered to remove non-solar radiation) for 500–600 hours. After this exposure, the fibre was examined and no yellowing found.

From the foregoing description it becomes clearly manifest that the process may be utilized in continuous filament yarn or staple fibre treatment by passing at a regulated speed through the solution bath, the solution bath being replenished from time to time.

The following examples illustrate the treatment of polyester fibre with compounds of the foregoing formula in solution of diethylene glycol. It is to be understood that these examples are merely illustrative and are not to be construed as being limitative. All parts given are by weight.

Example I 2 grams of 2,2'-dihydroxy-4,4'-dimethoxy benzophenone were dissoloved in 200 parts of diethylene glycol. The solution was heated to 360° F. and 10 parts of a polyester fibre ("Dacron," polyethylene terephthalate) were then immersed for 12 seconds at 360° F., removed, squeezed, rinsed in water and finally soaped. The soaped fibre was then again rinsed in water to remove all soap, dried and a swatch thereof subjected to a fadeometer test for 600 hours. After the test, an examination of the fibre showed no yellowing or any evidence of molecular degradation.

Example II

Example I was repeated with the exception that 2 parts of 2,2'-dihydroxy-4,4'-dimethoxy benzophenone were replaced by 2 parts of 2,2'-dihydroxy-4,4'-dipropoxy benzophenone. After exposure of 600 hours in the fadeometer the staple fibre showed no discoloration or any molecular degradation.

Example III

Example I was again repeated with the exception that the 2,2'-dihydroxy-4,4'-dimethoxy benzophenone was replaced by an equivalent amount of 2,2'-dihydroxy-4,4'-diamyloxy benzophenone with the same results as in Example I.

Example IV 3 parts of 2,2',4-trihydroxy-4'-methoxy benzophenone were dissolved in 200 parts of diethylene glycol. The solution was heated to 360° F. and 15 parts of a polyester fibre ("Dacron," polyethylene terephthalate) were then immersed for 10 seconds at 360° F., removed, squeezed, rinsed in water and finally soaped. The soaped fibre was then immersed in an aqueous dyebath containing 1-amino-4-anilinoanthraquinone as the dye. The dyebath was heated at the boil for 1½ hours. After rinsing and soaping, the fibre was dried and an attractive blue shade produced. The dyed fibre was exposed in the fadeometer for 55 hours. Thereafter the dyed fibre was examined and found to be of the same blue shade thus indicating remarkable light fastness compared to the same polyester fibre dyed by the same procedure but not having any 2,2',4-trihydroxy-4'-methoxy benzophenone in its filaments.

Example V 2 parts of 2,2',4-trihydroxy-4'-ethoxy benzophenone were dissolved in 200 parts of diethylene glycol. The solution was heated to 355° F. and 10 parts of polyester fibre ("Dacron," polyethylene terephthalate) were then immersed for 8 seconds at 355° F., removed, squeezed and rinsed in water and dried. The dried fibre was exposed to a fadeometer for 600 hours. After removal from the fadeometer, the treated fibre showed no discoloration, i.e. yellowing or molecular degradation.

Example VI

Example V was repeated with the exception that the 2,2',4-trihydroxy-4'-ethoxy benzophenone was replaced by an equivalent amount of 2,2',4-trihydroxy-4'-butoxy benzophenone with the same identical results.

From the foregoing description and illustrative examples it becomes clearly manifest that the 2,2'-dihydroxy-4,4'-dialkoxy benzophenones and the 2,2',4-trihydroxy-4-alkoxy benzophenones have excellent affinity or substantivity for polyethylene terephthalate fibres. It is rather unusual and unexpected that the benzophenones characterized by the foregoing general formula can be applied with relative ease to polyester fibres either as filament yarns or staple fibres extending from 2 to 140 denier. It is even more remarkable that the treated polyester fibre can tolerate all classes of dyes having an affinity therefor without degradation of the fibre or the dye.

By the term "polyester fibre" as employed in the appended claims, I include the filament yarns, staple fibres and cloth fabricated from such fibres.

I claim:
1. A non-halogenated linear polyester fibre devoid of aliphatic unsaturation stabilized against degradation by exposure to ultraviolet light having uniformly distributed throughout each individual filament of said fibre an ultraviolet absorbing amount of a compound having the following general formula:

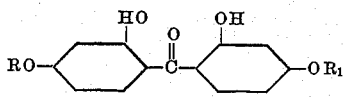

wherein R represents a member selected from the class consisting of hydrogen and an alkyl group of 1 to 5 carbon atoms, and $R_1$ is an alkyl radical of 1 to 5 carbon atoms.

2. A polyester fibre according to claim 1 wherein the ultraviolet absorbing compound is 2,2'-dihydroxy-4,4'-dimethoxy benzophenone.

3. A polyester fibre according to claim 1 wherein the ultraviolet absorbing compound is 2,2'-dihydroxy-4,4'-dipropoxy benzophenone.

4. A polyester fibre according to claim 1 wherein the ultraviolet absorbing compound is 2,2'-dihydroxy-4,4'-diamyloxy benzophenone.

5. A polyester fibre according to claim 1 wherein the ultraviolet absorbing compound is 2,2',4-trihydroxy-4'-ethoxy benzophenone.

6. A polyester fibre according to claim 1 wherein the ultraviolet absorbing compound is 2,2',4-trihydroxy-4'-butoxy benzophenone.

7. The process of stabilizing a non-halogenated linear polyester fibre devoid of aliphatic unsaturation against ultraviolet light degradation which comprises treating the said fibre with diethylene glycol having dissolved therein 0.5–3% by weight of an ultraviolet absorbing compound having the following general formula:

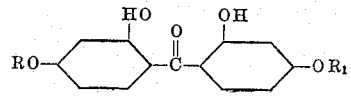

wherein R represents a member selected from the class consisting of hydrogen and an alkyl group of 1 to 5 carbon atoms, and $R_1$ is an alkyl radical of 1 to 5 carbon atoms, said treatment being conducted at a temperature of 340–365° F. followed by removing excess diethylene glycol solution from the fibre and rinsing in water.

8. The process according to claim 7 wherein the ultraviolet absorbing compound is 2,2'-dihydroxy-4,4'-dimethoxy benzophenone.

9. The process according to claim 7 wherein the ultraviolet absorbing compound is 2,2'-dihydroxy-4,4'-dipropoxy benzophenone.

10. The process according to claim 7 wherein the ultraviolet absorbing compound is 2,2',4-trihydroxy-4'-diamyloxy benzophenone.

11. The process according to claim 7 wherein the ultraviolet absorbing compound is 2,2',4-trihydroxy-4-ethoxy benzophenone.

12. The process according to claim 7 wherein the ultraviolet absorbing compound is 2,2',4-trihydroxy-4'-butoxy benzophenone.

References Cited in the file of this patent
UNITED STATES PATENTS
2,819,247    Lundberg _____ Jan. 7, 1958

UNITED STATES PATENT OFFICE

CERTIFICATE OF CORRECTION

Patent No. 2,920,978                 January 12, 1960

David I. Randall

It is hereby certified that error appears in the printed specification of the above numbered patent requiring correction and that the said Letters Patent should read as corrected below.

Column 1, line 20, for "means" read -- names --; column 3, line 11, for "substantially" read -- substantively --; column 6, lines 23 and 24, for "2,2',4-trihydroxy-4'-diamyloxy benzophenone" read -- 2,2'-dihydroxy-4,4'-diamyloxy benzophenone --; lines 26 and 27, for "2,2',4-trihydroxy-4-ethoxy benzophenone" read -- 2,2',4-trihydroxy-4'-ethoxy benzophenone --.

Signed and sealed this 4th day of October 1960.

(SEAL)

Attest:

KARL H. AXLINE                               ROBERT C. WATSON

Attesting Officer                           Commissioner of Patents